United States Patent
Yamkovoy et al.

(10) Patent No.: US 9,966,847 B2
(45) Date of Patent: May 8, 2018

(54) ADAPTIVE FAIL-SAVE POWER-ON CONTROL CIRCUIT

(71) Applicant: Bose Corporation, Framingham, MA (US)

(72) Inventors: Paul G. Yamkovoy, Acton, MA (US); Matthew Neil Ruwe, Hopedale, MA (US)

(73) Assignee: Bose Corporation, Framingham, MA (US)

( * ) Notice: Subject to any disclaimer, the term of this patent is extended or adjusted under 35 U.S.C. 154(b) by 0 days. days.

(21) Appl. No.: 15/211,389

(22) Filed: Jul. 15, 2016

(65) Prior Publication Data

US 2017/0019025 A1   Jan. 19, 2017

Related U.S. Application Data

(60) Provisional application No. 62/193,745, filed on Jul. 17, 2015.

(51) Int. Cl.
  *G05F 1/56* (2006.01)
  *H02M 3/158* (2006.01)
  (Continued)

(52) U.S. Cl.
  CPC .............. *H02M 3/158* (2013.01); *G05F 3/00* (2013.01); *H02M 1/36* (2013.01); *H02M 3/156* (2013.01);
  (Continued)

(58) Field of Classification Search
  CPC ............ G05F 1/56; G05F 3/00; H02M 3/156; H02M 3/158
  (Continued)

(56) References Cited

U.S. PATENT DOCUMENTS

| 7,557,550 B2* | 7/2009 | Mellachurvu | G05F 1/575 323/281 |
| 8,129,973 B2* | 3/2012 | Xi | H02M 3/156 323/284 |
| 2007/0146048 A1 | 6/2007 | Debroux | |

FOREIGN PATENT DOCUMENTS

| EP | 2594022 A1 | 5/2013 |
| WO | 2012012331 A1 | 1/2012 |

OTHER PUBLICATIONS

Invitation to Pay Additional Fees dated Oct. 14, 2016 for International application No. PCT/US2016/042711.

(Continued)

*Primary Examiner* — Adolf Berhane
*Assistant Examiner* — Nusrat Quddus (57) ABSTRACT

A circuit includes an input for receiving power from an external power supply, a voltage regulator coupled to the power input and providing regulated voltage to an external circuit and to the power supply control circuit itself, and a first switch coupled between ground and an Enable input of the voltage regulator. A control input of the first switch is coupled to the regulated voltage, such that when the voltage regulator provides regulated voltage, the first switch is closed, coupling the Enable input to ground, keeping the voltage regulator active. A first switching circuit provides manual activation and deactivation of the voltage regulator; a second switching circuit provides automatic activation of the voltage regulator whenever the power input becomes powered. An intervening circuit prevents the second switching circuit from activating the voltage regulator when the first switching circuit has deactivated it, despite the continued presence of the external power supply.

16 Claims, 4 Drawing Sheets

(51) Int. Cl.
   *H02M 1/36*    (2007.01)
   *G05F 3/00*    (2006.01)
   *H02M 3/156*   (2006.01)
   *H04R 1/10*    (2006.01)

(52) U.S. Cl.
   CPC ........ *H04R 1/1041* (2013.01); *H04R 2460/01* (2013.01)

(58) Field of Classification Search
   USPC .......................................... 323/271–285, 315
   See application file for complete search history.

(56)             References Cited

OTHER PUBLICATIONS

International Search Report and Written Opinion dated Nov. 24, 2016 for International application No. PCT/US2016/042711.

\* cited by examiner

ADAPTIVE FAIL-SAVE POWER-ON CONTROL CIRCUIT

PRIORITY CLAIM

This application claims priority to provisional application 62/193,745, filed Jul. 17, 2015, the entire contents of which are hereby incorporated by reference.

BACKGROUND

This disclosure relates to an adaptive fail-safe power-on control circuit, and specifically, a power control circuit for an aviation headset.

SUMMARY

A power supply control circuit includes a power input for receiving power from an external power supply, a voltage regulator coupled to the power input and providing regulated voltage to an external circuit and to the power supply control circuit itself, and a first, normally-open, electrically-operated, switch coupled between ground and an active-low Enable input of the voltage regulator. A control input of the first switch is coupled to the regulated voltage, such that when the voltage regulator provides the regulated voltage, the first switch is closed, coupling the Enable input of the voltage regulator to ground, keeping the voltage regulator active. A first power switching circuit provides manual activation and deactivation of the voltage regulator; a second power switching circuit provides automatic activation of the voltage regulator whenever the power input becomes powered. An intervening circuit prevents the second power switching circuit from activating the voltage regulator when the first power switching circuit has deactivated the voltage regulator, despite the continued presence of power from the external power supply on the power input.

Implementations may include one or more of the following, in any combination. The intervening circuit may include a second, normally-open, electrically-operated, switch, the second switch being closed by the second power switching circuit when the second power switching circuit is first activated, and being opened by the second power switching circuit when regulated voltage is provided to the second power switching circuit. The second switch is connected between an Enable input of the voltage regulator and ground, with a control input coupled to an output of the second power switching circuit.

The first power switching circuit may include a third, normally-open, momentary switch coupled between a fourth, normally-closed, electrically-controlled, switch at a first node and an Enable input of the voltage regulator at a second node, the fourth switch coupling the first node of the third switch to ground such that when both the third switch and the fourth switch are closed, the Enable input of the voltage regulator is coupled to ground, activating the voltage regulator, and a control circuit having an input coupled to the first node of the third switch, an output coupled to the control input of the first switch, and a connection to ground, wherein when the voltage regulator provides the regulated voltage, the fourth switch is opened, disconnecting the first node of the second switch from ground, and the control circuit is configured to deactivate the voltage regulator by coupling the gate of the first switch to ground, thus opening the first switch and disconnecting the Enable input of the voltage regulator from ground. The control circuit may disable the voltage regulator when the third switch is closed and regulated voltage is present. When regulated voltage is present, closing the third switch couples the input of the control circuit to the Enable input of the voltage regulator, the Enable input being held at ground by the first switch until the control circuit opens the first switch. The fourth switch may include a depletion-mode junction field-effect transistor (JFET) that opens upon receiving negative voltage to its gate from a bias supply powered by the regulated voltage.

The second power switching circuit may include a latching circuit coupled to the power input, the regulated voltage, ground, and a control output to the intervening circuit, wherein when power is first received on the power input, the latching circuit is latched into a first state providing a voltage from the power input to the control output, and when the regulated voltage is subsequently received, the latching circuit is latched into a second state connecting the control output to ground. The latching circuit may include a first transistor, having a gate connected to the power input via a first resistor and to the control output, a drain connected to the power input via a second resistor, and a source connected to ground, and a second transistor, having a gate connected to the drain of the first transistor via a third transistor and to the regulated voltage, a drain connected to the control output, and a source connected to ground, wherein the power supply voltage, in the absence of the regulated voltage, activates the first transistor and the control output, the first transistor connecting the gate of the second transistor to ground through the third resistor, setting the latching circuit to the first state, and the regulated voltage, when present, activates the second transistor, which couples the gate of the first transistor and the control output to ground, setting the latching circuit to the second state. The first and second transistors may include metal-oxide-semiconductor field-effect transistors (MOSFETs). A second switch May be interposed between the power input and the latching circuit, the second power switching circuit only being active when the second switch is closed. The second switch may include a metal-oxide-semiconductor field-effect transistor (MOSFET). The first switch may include a metal-oxide-semiconductor field-effect transistor (MOSFET). A battery may be connected to the voltage regulator, wherein the voltage regulator provides the regulated voltage when enabled regardless of the presence of power on the power input.

The first power switching circuit may be configured to deactivate the voltage regulator automatically when a related circuit is not in use. The second power switching circuit may includes a latching circuit coupled to the power input, the regulated voltage, ground, and a control output to the intervening circuit, such that when power is first received on the power input, the latching circuit is latched into a first state providing a voltage from the power input to the control output, and when the regulated voltage is subsequently received, the latching circuit is latched into a second state connecting the control output to ground.

In general, in one aspect, an audio source selection circuit for selecting between first and second audio inputs for combining with a third audio input includes a first input receiving an indication that the first audio input is active, a second input receiving an indication that the second audio input is active, a third input receiving an indication of whether the first or second audio input is prioritized, a fourth input receiving an indication of whether the first audio input is in a first mode or a second mode, a first output controlling a first switch to couple the first audio input to an audio output, and a second output controlling a second switch to couple the second audio input to an audio output.

Implementations may include one or more of the following, in any combination. A first NAND gate may have its inputs connected to the first and second inputs, producing an output high unless both first and second inputs are low; a first, normally open, transistor may have a gate coupled to the fourth input, and a source coupled to ground; a second NAND gate may have both of its inputs connected to a voltage supply via a resistor, and to the drain of the first transistor through a switch that is open when the third input indicates that the first audio input is prioritized and the first transistor; a first NOR gate may have a first input connected to the output of the first NAND gate, and a second input connected to the voltage supply via the resistor; a second NOR gate may have a first input connected to the output of the first NAND gate, and a second input connected to the output of the second NAND gate; a second, normally-open, transistor may have a gate coupled to the output of the first NOR gate, a source connected to ground, and a drain connected to the first output; and a third, normally open, transistor may have a gate coupled to the output of the second NOR gate, a source connected to ground, and a drain connected to the second output. When the first input is connected to the first output via a first resistor, and the second input is connected to the second output via a second resistor, the first input directly controls the first output, and the second input directly controls the second output, unless the corresponding NOR gates close the corresponding transistors.

A prioritization circuit may include a prioritization activation circuit that determines whether the third audio input is above or below a threshold, and a priority switch having three input states; when the priority switch is in the first state, the prioritization circuit provides an enable output regardless of the state of the third input; when the priority switch is in the second state; the prioritization circuit provides an enable output only when the third input is below the threshold; and when the priority switch may be in the third state, the prioritization circuit may not provide the enable output. The first and second outputs may include respective first and second AND gates, each of the first and second AND gates receiving corresponding first or second input enable signals at its first input, and receiving the enable output from the prioritization circuit at its second input, such that the first and second AND gates only activate the respective first or second switches if the prioritization circuit provides the enable output.

All examples and features mentioned above can be combined in any technically possible way. Other features and advantages will be apparent from the description and the claims.

DESCRIPTION

Automatic and Manual Power Control

A common problem in active noise reduction (ANR) headsets for use in aircraft is that the headsets must be turned on and off—the pilot or passengers need to be able to turn them off if something goes wrong with the ANR system, for example. If a headset is configured to simply power-up when it receives power from the aircraft, the manual power-off control may prevent the headset from powering on the next time the aircraft is started. Some headsets have an automatic power-off feature, when operating from internal battery power, to preserve that battery, which they detect that the headset is not in use, as described in U.S. Pat. Nos. 8,222,641, 8,666,083, and 8,213,625, the entire contents of which are incorporated here by reference. As with the manual on-off control, the auto-off feature may conflict with the auto-on feature. One goal of this disclosure is to provide a headset that will power on with the aircraft radio (or when connected to an already-powered aircraft radio), provide manual on-off control, and to not have the manual and automatic controls conflict with each other.

Figure 1:
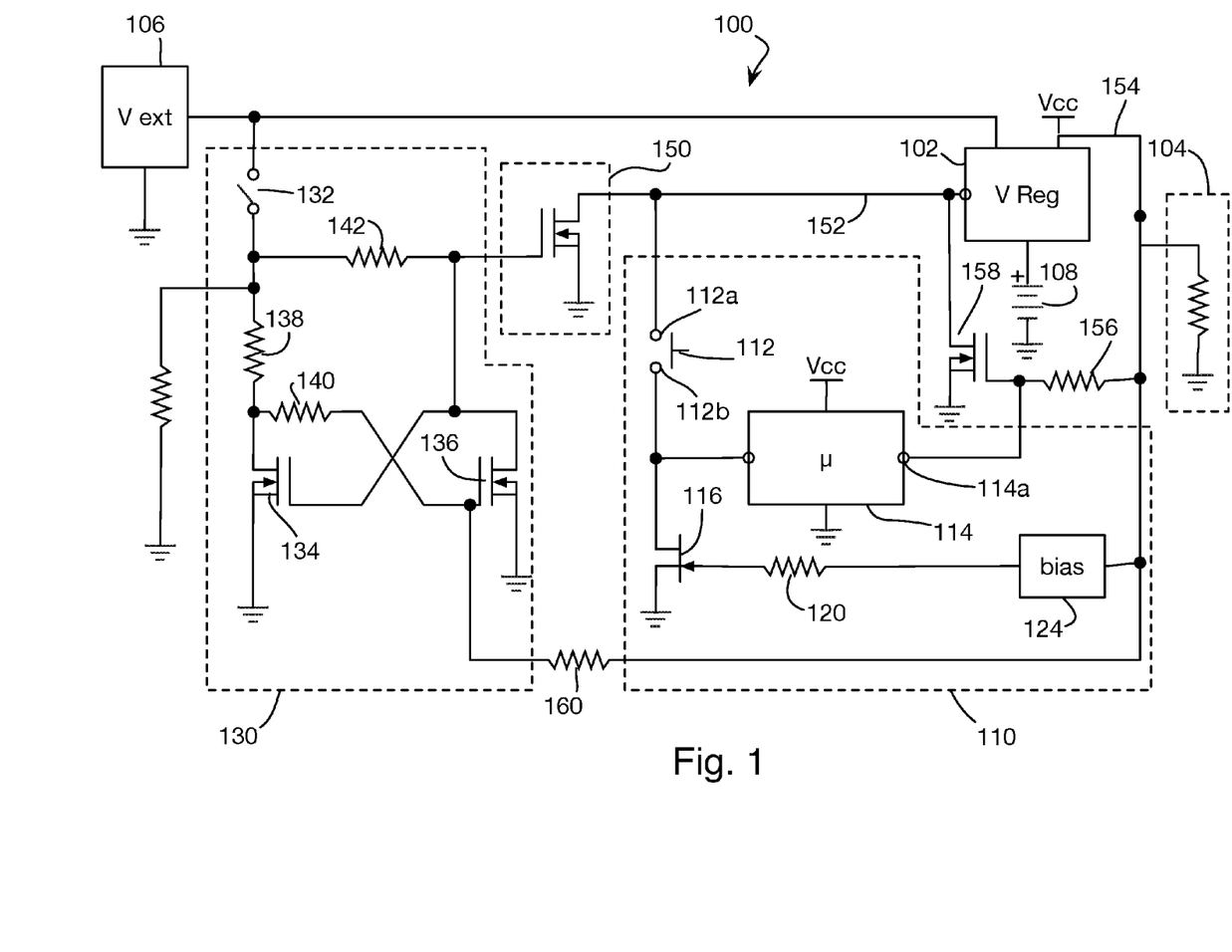
FIGS. 1 through 4 are circuit diagrams.

A circuit that provides this functionality is shown in FIG. 1. The power management circuit 100 includes a voltage regulator 102 that provides power to the headset 104, as well as to the rest of the power management circuit itself. The headset is represented by box 104, which is meant simply to show that the headset presents a load to the voltage regulator, and has a common ground with the power management circuit. The voltage regulator 102 receives power from an external power supply 106, generally the aircraft intercom system (ICS). The voltage regulator may optionally receive power from a battery 108, to provide power when disconnected from the ICS or in aircraft where the ICS does not provide operating voltage to the headset.

The power management circuit 100 has two control circuits 110 and 130, joined by an intervening circuit 150, which in the example of FIG. 1 happens to be a single transistor. Control circuit 110 provides manual on-off control, and optionally automatic-off control. It includes a momentary push-button switch 112, a microcontroller 114, a transistor 116, a resistors 120, and a bias source 124. The manual control circuit 110 is connected to an Enable input 152 of the voltage regulator 102, and receives regulated voltage Vcc from the voltage regulator output 154. The manual control circuit is also connected to the gate of a transistor 158, described below.

The transistor 116 is a normally-closed transistor, such as a depletion-mode JFET (junction field effect transistor). The switch 112 has two terminals 112a and 112b. The first terminal is connected to the Enable input 152 of the voltage regulator, and the other is connected to the drain of the transistor 116. When the switch 112 is pressed, this couples the Enable input 152 to ground through the transistor 116, pulling the Enable input 152 down and activating the voltage regulator 102. Once activated, the voltage regulator begins providing the Vcc voltage, which flows through a pull-up resistor 156 to the gate of a latch transistor 158. This transistor is a normally-open transistor, such as an enhancement mode MOSFET. Positive voltage at its gate activates the transistor 158, closing it and coupling the Enable input 152 to ground at a second point. This latches the voltage regulator on, as its own output voltage is holding closed the transistor controlling its Enable input.

Once the voltage regulator begins supplying Vcc, the bias source 124 begins generating a bias voltage that activates the normally-closed transistor 116, opening it and disconnecting the second terminal of the switch 112 from the ground. As the Enable input is still held low by transistor 118, this has the effect of converting the switch 112 into an input device for the microcontroller 114. When the microcontroller determines that the headset should be turned off, either due to an input from the user on the switch 112, such as holding it in, or due to software or other inputs (not shown) implementing an auto-off function, it couples its control output 114a to ground. This pulls the gate of transistor 158 to ground, deactivating that transistor, decoupling the Enable input 152 of the voltage regulator from ground and turning the voltage regulator off. Once the voltage regulator is turned off, the Vcc voltage is no longer available to hold the transistor 158 closed (even after the microcontroller 114 is deactivated), so it will stay off until re-enabled. The bias source 124 will also be deactivated, allowing the transistor 116 to close and resetting the control circuit for switch 112 to turn the voltage regulator back on when pressed.

The auto-on control circuit 130 includes an optional activation switch 132, a pair of transistors 134, 136, and three resistors 138, 140, 142. The control circuit is connected to the external power supply 106, the regulated Vcc voltage 154 (via resistor 160), and the input of the intervening circuit 150. In an initial state, when no voltage is present, both transistors 134, 136 are inactive, and therefore open (providing high impedance between their source and drain). When power is first received from the external supply 106 (assuming the activation switch 132 is closed), current flows from the input, through resistors 138 and 140, to the inactive Vcc input. Because of the resistor 160 between the voltage regulator and the control circuit, these resistors operate as a voltage divider, placing a voltage on the gate of the second transistor 136 that happens to be about half of the voltage supplied by the external supply. At the same time, because the gate of the first transistor presents a high impedance, the full voltage of the external input will also appear there, though the third resistor 142. Because the larger voltage develops on the gate of the first transistor 134, it will reach threshold and activate before the second transistor 136. As soon as the first transistor 134 is activated, it couples the gate of the second transistor 136 to ground through the resistor 140, stopping it from activating before its gate voltage reaches threshold.

Because the first transistor is activated and the second is deactivated, the output of the control circuit has no path to ground and will follow the external voltage through the third resistor 142. This activates the intervening circuit (described below) to pull the Enable input 152 of the voltage regulator low, activating the voltage regulator to supply Vcc on the regulated voltage output 154. Turning on the voltage regulator also provides power to the latching transistor 158, as well as the microcontroller 114, bias supply 124, and transistor 116 inside the manual control control circuit 110. This latches the voltage regulator on and configures the switch 112 as an input to the microcontroller just as if the system had been turned on manually.

The two transistors of the auto-on control circuit implement an un-clocked flip-flop or latching circuit. After the appearance of Vcc from the voltage regulator, the voltage at the gate of the second transistor 136 will be pulled up to about the mid-point between the regulated and external voltages, well above its threshold. At this point, the second transistor will be activated, connecting the gate of the first transistor 134 to ground and deactivating it. This reversal connects the output of the control circuit to ground, deactivating the intervening circuit. Because the voltage regulator is now held enabled by the manual control circuit, disabling the intervening circuit has the effect of disconnecting the auto-on control circuit from the system after it has turned the system on. This allows the user or the microcontroller to turn the system off without the auto-on system turning it back on until after external power has also been removed (or the auto-on activation switch 132 is cycled). That is because, even if Vcc is removed because the headset has been turned off, the divided external voltage at the gate of the second transistor 136 remains above threshold, so that transistor stays activated, connecting the gate of the first transistor directly to ground, and not allowing the external voltage to flip the transistors back to the state where they activated the intervening circuit. Once the external voltage is also removed, both transistors lose their gate voltage and reset to the initial condition.

As noted, in this example, the intervening circuit 150 is merely a single, normally-open transistor, such as a MOSFET, with its source connected to ground and its drain connected to the Enable input of the voltage regulator. When the auto-on control circuit 130 provides a voltage at its output, this activates the transistor, coupling the Enable input 152 of the voltage regulator to ground. When the regulated Vcc voltage flips the state of the auto-on control circuit, the voltage at the gate of the intervening circuit transistor goes to ground, decoupling the Enable input from ground, but by that time, the Enable input is being held at ground by the manual control circuit 110.

Source Management

In some examples, a headset has inputs for three separate audio sources, the intercom (ICS), Bluetooth (BT) audio, and wired auxiliary audio (AUX). In addition, the BT audio may provide either phone call audio (HFP, for hands-free profile) or stereo audio (A2DP). If more than one audio source is available at one time, the system can either mix them together, or prioritize one over the other. Some systems choose to lower the volume of the lower-priority audio, while others choose to disconnect it entirely. The system described below provides several degrees of prioritization. First, ICS audio is prioritized over all other sources, and never disconnected. A user input determines whether additional audio sources should be mixed with the ICS, silenced when the ICS is active, or shut off entirely. A second user input determines between A2DP and AUX which is to take priority if both of those are active at the same time. The system assumes that HFP is to take priority over AUX regardless of this setting, but this could also be changed.

Figure 2:
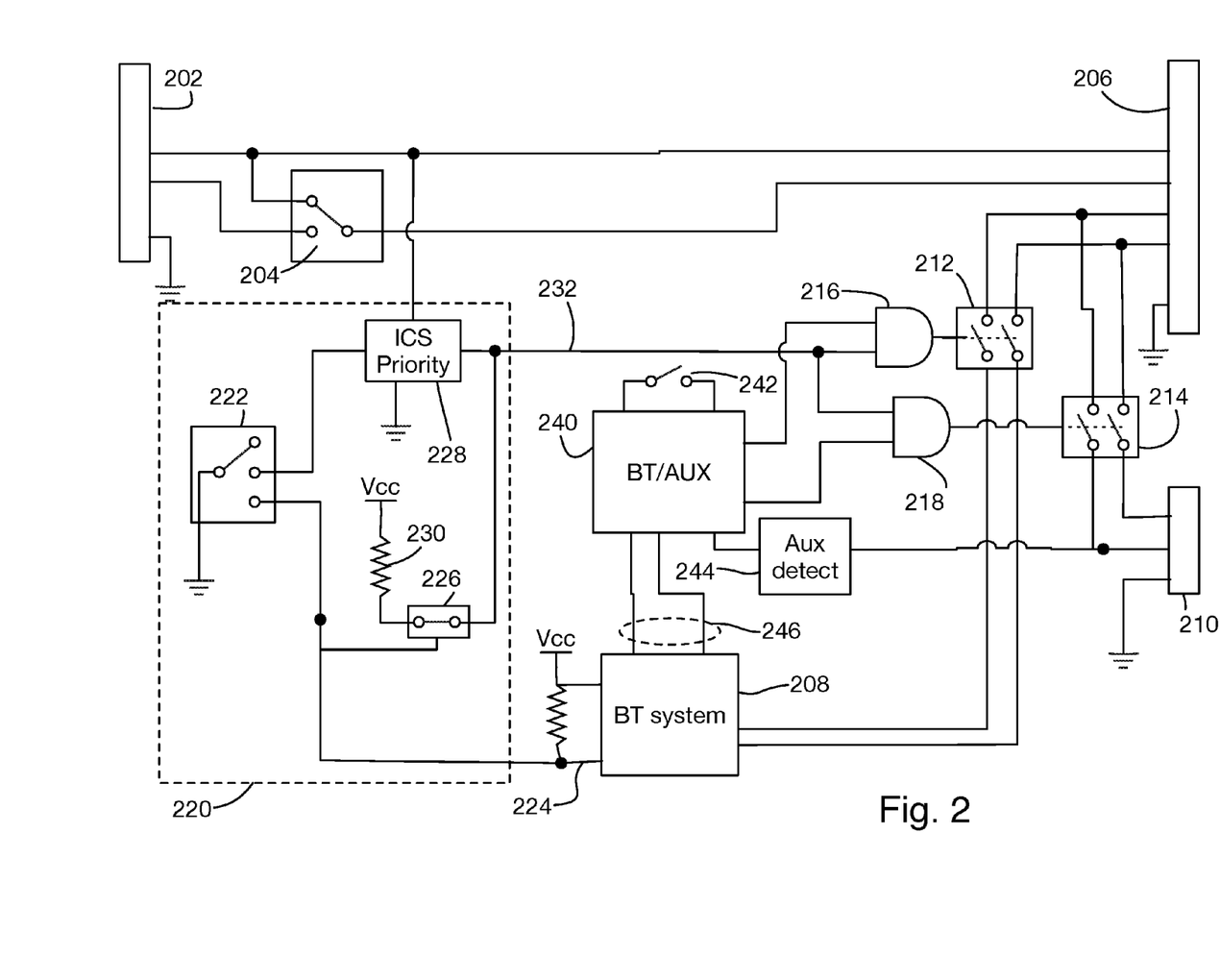

FIG. 2 shows the first stage of this prioritization scheme. Aircraft ICS audio is received at an aircraft connector 202, where a stereo/mono switch 204 may allow duplication of a mono signal to both ear cups. The ICS audio passes through un-interrupted to the headphone connector 206. Bluetooth audio system 208 provides two BT audio signals, and provides status output signals. An AUX connector 210 provides two AUX audio signals. The BT and AUX audio are connected to the headphone connector 206 by a pair of dual-pole, single-throw switches 212, 214, which are in turn controlled by a pair of AND gates 216, 218. The AND gates are controlled by a combination of an ICS priority sub-circuit 220, and a secondary priority sub-circuit 240.

In the ICS priority sub-circuit 220, a priority switch 222 has three positions, from the top down they are silence, mix, and all-off. In the all-off position, the switch 222 connects an Enable input 224 of the BT system to ground, disabling the BT system. In some examples, a separate BT power supply may be present, and the switch may connect an enable of that power supply to ground to disable the BT system. The switch 222 in the all-off position also connects a normally-closed switch 226 between Vcc and the output of a priority module 228 to ground, opening that switch. In the middle, "mix" position, the switch 222 connects a Disable input of the priority module 228 to ground, stopping the priority module from disconnecting either the BT or the AUX inputs. The switch 226 is left closed, connecting the Vcc power, through a pull-up resistor 230, to the output 232 of the sub-system, which is connected to the pair of AND gates 216, 218. With the switch not connecting the BT power supply Enable input 224 to ground, it is pulled up by Vcc and a pull-up resistor and enabled. Finally, in the bottom, "silence" position, the priority switch is not connected to anything—the BT power supply and priority module are enabled, and the output 232 is pulled up by Vcc and the resistor 230. In this mode, if the priority module determines that the ICS is active and secondary audio should be silenced, it pulls the output 232 low, deactivating both AND gates 222, 224, and opening both switches 226, 228.

Assuming the ICS priority sub-circuit has not disabled the AND gates 216, 218, the secondary priority sub-circuit 240 enables one and disables the other to control which of BT or AUX audio is passed to the headset. An Aux/BT priority switch 242 determines which of the two takes priority, and an Aux detect circuit 244 determines whether the AUX input is active. The BT system outputs 246 inform the sub-circuit 240 directly whether the BT is active and which mode it is in. The operation of the secondary priority sub-circuit 240 is shown in more detail in FIG. 3.

Figure 3:
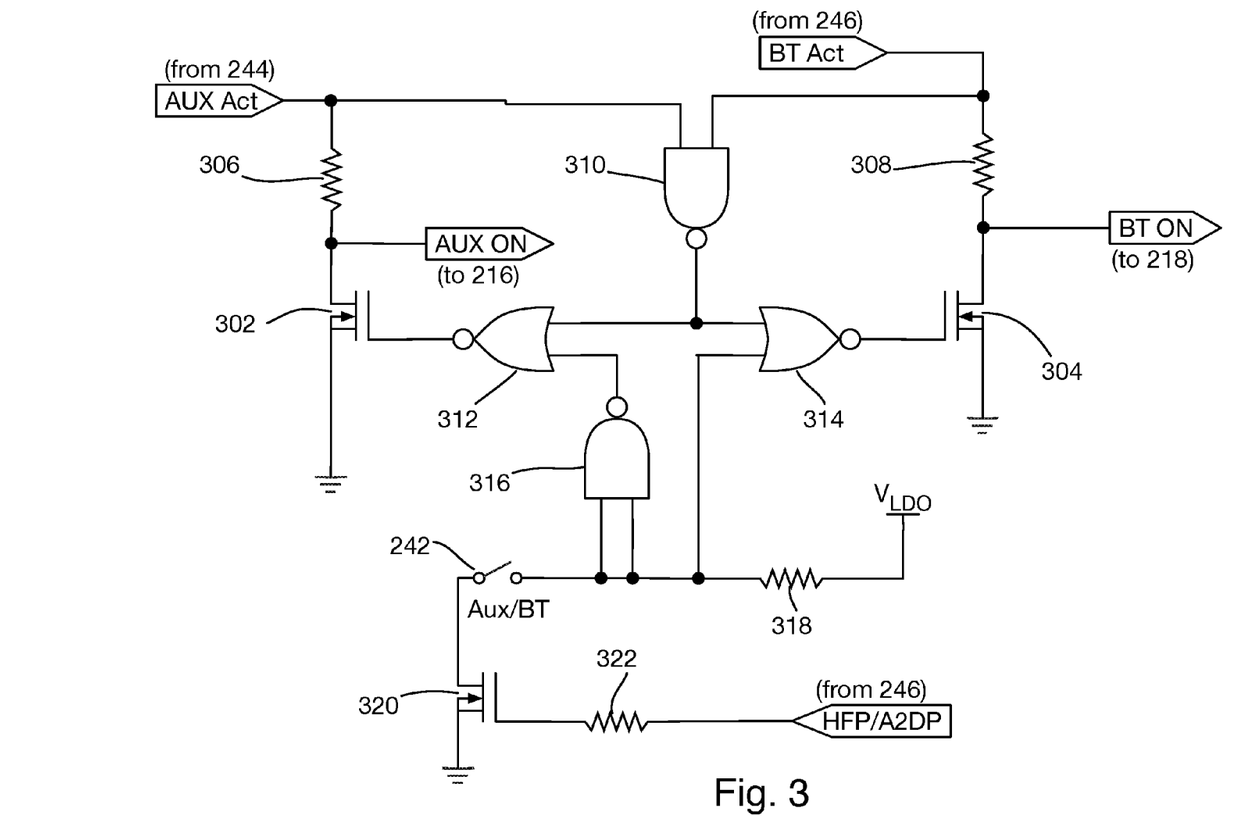

The circuit in FIG. 3 has inputs AUX Act from the Aux detect circuit 244, and BT Act and HFP/A2DP from the BT system. The circuit's outputs are BT ON and AUX ON, which connect to corresponding AND gates 216, 218 in the circuit of FIG. 2. The Aux/BT priority switch 242 is shown again for clarity. In this circuit, the two output lines are connected to the drains of corresponding transistors 302, 304, which have their sources connected to ground. The outputs are also connected to the corresponding Act inputs, via pull-up resistors 306, 308. The logic gates 310, 312, 314, and 316 are configured to activate one or the other of the transistors to disable the corresponding ON output line. If one of the transistors is not active, and the corresponding Act input is high, it will pull the corresponding ON output high.

The first gate 310 is a NAND gate with its inputs coupled to the two Act inputs, and its output coupled to the inputs of the second and third gates, 312, 314, both NOR gates. The second gate 312 has its second input coupled to the output of the fourth gate 316, another NAND gate, while the third gate has its second input coupled to a voltage high $V_{LDO}$ through a pull-up resistor 318. The fourth gate 316 has both of its inputs also connected to the pull-up resistor 318. The three inputs connected to the pull-up resistor 318 are also connected to the Aux/BT switch 242, and through it to a transistor 320. The transistor 320 is a normally-open device, such as a MOSFET, and it connects the Aux/BT switch to ground when it is closed. The gate of the transistor is controlled by the HFP/A2DP input 246 via another resistor 322.

Table 1 shows the logic implemented by the circuit of FIG. 3. The inputs are Aux Act, indicating that there is signal on the AUX input, BT Act, indicating the same for Bluetooth, Aux/BT, where the switch is closed when AUX is to take priority over Bluetooth, as indicated by a logical '1', and HFP/A2DP, where a '0' indicates that the current mode is HFP and a '1' indicates that the current mode is A2DP. For the first five states in the table, the outputs AUX ON and BT ON mimic the first two input columns. If neither input is active, both outputs are disabled. Even though, in this case, NAND gate 310 is outputting a logic '1' to both NOR gates 312 and 314, which in turn output logic '0' to open the transistors 302 and 304, since the activity inputs are both also logic '0', both outputs remain at '0'. If only one input is active, only that output is enabled. Again, the NAND 310 will output a logical '1', so both NOR gates 312 and 214 output logical '0' and open both transistors 302 and 304, but only one of Aux Act or BT Act is '1', so only the corresponding output will be '1'.

The third and fourth columns matter when both inputs are active. In this case, the NAND 310 will output a '0', leaving the output of the NOR gates in the control of their other inputs. As long as the HFP/A2DP input shows that the BT connection is A2DP, meaning entertainment audio, the Aux/BT switch controls, enabling AUX if closed and BT if open. That is, when the Aux/BT switch is open, the input of NOR gate 314 and both inputs of NAND gate 316 are pulled up by $V_{LDO}$ and the resistor 318. This makes NOR 314 output '0' to enable BT ON (since BT Aux is at '1'), while the '0' output by NAND 316 combined with the '0' output from NAND 310 makes NOR 312 output '1', closing transistor 302 and grounding the AUX ON output. When the Aux/BT switch is closed, it connects the input of NOR gate 314 and both inputs of NAND gate 318 to ground through MOSFET 320, so NOR gate 314 outputs a '1' grounding the BT ON output through MOSFET 304, and NAND gate 316 outputs a 1, causing NOR 312 to output '0' and allow the Aux act '1' to bring AUX ON to '1'.

If the HFP/A2DP input shows HFP, however, this opens the MOSFET 320, overriding the Aux/BT switch, enabling the BT connection and disabling the Aux input in the same way as if the Aux/BT switch were open. In other examples, a single switching device could be used, with its state controlled by both the HFP/A2DP line and the state of the Aux/BT preference, with either HFP mode or BT preference opening the switch. All of the logic implemented by this circuit could alternatively be implemented using inverted logic and corresponding gate and transistor types, and it could also be implanted in a programmed device, such as a FPGA, microcontroller, microprocessor, or the like.

TABLE 1

| Inputs | | | | Outputs | |
|---|---|---|---|---|---|
| AUX act | BT act | Aux/BT Closed = 1 | HFP/A2DP HFP = 0 | AUX ON | BT ON |
| 0 | 0 | 1 | 1 | 0 | 0 |
| 0 | 0 | 0 | 1 | 0 | 0 |
| 0 | 1 | 1 | 1 | 0 | 1 |
| 0 | 1 | 0 | 1 | 0 | 1 |
| 1 | 0 | 1 | 1 | 1 | 0 |
| 1 | 0 | 0 | 1 | 1 | 0 |
| 1 | 1 | 1 | 1 | 1 | 0 |
| 1 | 1 | 0 | 1 | 0 | 1 |
| 1 | 1 | 1 | 0 | 0 | 1 |

Figure 4:
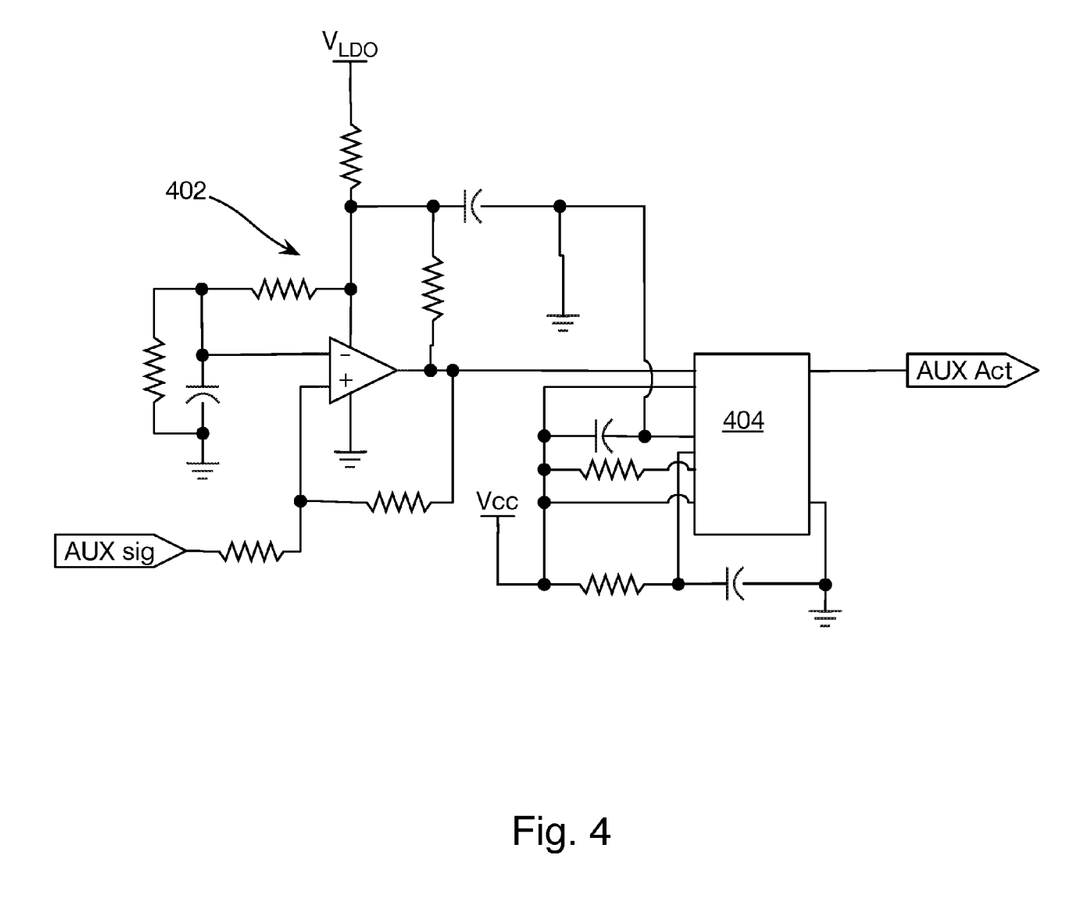

FIG. 4 shows one example of the Aux detect circuit 244 from FIG. 2. In this example, a high-sensitivity comparator circuit 402 detects the presence of peaks above a certain threshold (determined by the discrete circuit elements) on the AUX signal line, and provides a pulse stream as long as the signal includes content above the threshold. This pulse stream is provided to a retriggerable monostable vibrator 404, with a time constant set such that pulses that represent ongoing audio content will keep the output AUX Act high, for example, 2.7 seconds. When the audio stays below the threshold long enough that no peak re-triggers the output, the AUX Act output will drop low. This is simply one example of a circuit that can provide the logical AUX Act signal to the circuit of FIG. 3, any other suitable audio signal detection scheme would work, such as a programmed digital signal processor, in which both the threshold signal level and the retriggering time constant could be set in software.

A number of implementations have been described. Nevertheless, it will be understood that additional modifications may be made without departing from the scope of the inventive concepts described herein, and, accordingly, other embodiments are within the scope of the following claims.

What is claimed is:

1. A power supply control circuit comprising:
a power input for receiving power from an external power supply;
a voltage regulator coupled to the power input and providing regulated voltage to an external circuit and to the power supply control circuit itself;
a first, normally-open, electrically-operated, switch coupled between ground and an active-low Enable input of the voltage regulator, a control input of the first switch coupled to the regulated voltage, such that when the voltage regulator provides the regulated voltage, the first switch is closed, coupling the Enable input of the voltage regulator to ground, keeping the voltage regulator active;
a first power switching circuit providing manual activation and deactivation of the voltage regulator;
a second power switching circuit providing automatic activation of the voltage regulator whenever the power input becomes powered; and
an intervening circuit preventing the second power switching circuit from activating the voltage regulator when the first power switching circuit has deactivated the voltage regulator, despite the continued presence of power from the external power supply on the power input.

2. The circuit of claim 1, wherein the intervening circuit comprises a second, normally-open, electrically-operated, switch, the second switch being closed by the second power switching circuit when the second power switching circuit is first activated, and being opened by the second power switching circuit when regulated voltage is provided to the second power switching circuit.

3. The power supply regulation circuit of claim 2, wherein the second switch is connected between an Enable input of the voltage regulator and ground, with a control input coupled to an output of the second power switching circuit.

4. The power supply regulation circuit of claim 3, wherein the first power switching circuit comprises:
a third, normally-open, momentary switch coupled between a fourth, normally-closed, electrically-controlled, switch at a first node and an Enable input of the voltage regulator at a second node, the fourth switch coupling the first node of the third switch to ground such that when both the third switch and the fourth switch are closed, the Enable input of the voltage regulator is coupled to ground, activating the voltage regulator; and
a control circuit having an input coupled to the first node of the third switch, an output coupled to the control input of the first switch, and a connection to ground;
wherein when the voltage regulator provides the regulated voltage, the fourth switch is opened, disconnecting the first node of the second switch from ground, and
the control circuit is configured to deactivate the voltage regulator by coupling the gate of the first switch to ground, thus opening the first switch and disconnecting the Enable input of the voltage regulator from ground.

5. The power supply regulation circuit of claim 4, wherein the control circuit disables the voltage regulator when the third switch is closed and regulated voltage is present.

6. The power supply regulation circuit of claim 5, wherein, when regulated voltage is present, closing the third switch couples the input of the control circuit to the Enable input of the voltage regulator, the Enable input being held at ground by the first switch until the control circuit opens the first switch.

7. The power supply regulation circuit of claim 4, wherein the fourth switch comprises a depletion-mode junction field-effect transistor (JFET) that opens upon receiving negative voltage to its gate from a bias supply powered by the regulated voltage.

8. The power supply regulation circuit of claim 2,
wherein the second power switching circuit comprises:
a latching circuit coupled to the power input, the regulated voltage, ground, and a control output to the intervening circuit,
wherein when power is first received on the power input, the latching circuit is latched into a first state providing a voltage from the power input to the control output, and
when the regulated voltage is subsequently received, the latching circuit is latched into a second state connecting the control output to ground.

9. The power supply regulation circuit of claim 8,
wherein the latching circuit comprises:
a first transistor, having a gate connected to the power input via a first resistor and to the control output, a drain connected to the power input via a second resistor, and a source connected to ground, and
a second transistor, having a gate connected to the drain of the first transistor via a third transistor and to the regulated voltage, a drain connected to the control output, and a source connected to ground,
wherein the power supply voltage, in the absence of the regulated voltage, activates the first transistor and the control output, the first transistor connecting the gate of the second transistor to ground through the third resistor, setting the latching circuit to the first state, and
the regulated voltage, when present, activates the second transistor, which couples the gate of the first transistor and the control output to ground, setting the latching circuit to the second state.

10. The power supply regulation circuit of claim 9, wherein the first and second transistors comprise metal-oxide-semiconductor field-effect transistors (MOSFETs).

11. The power supply regulation circuit of claim 8, further comprising a second switch interposed between the power input and the latching circuit, the second power switching circuit only being active when the second switch is closed.

12. The power supply regulation circuit of claim 2, wherein the second switch comprises a metal-oxide-semiconductor field-effect transistor (MOSFET).

13. The power supply regulation circuit of claim 1, wherein the first switch comprises a metal-oxide-semiconductor field-effect transistor (MOSFET).

14. The power supply regulation circuit of claim 1, further comprising a battery connected to the voltage regulator, wherein the voltage regulator provides the regulated voltage when enabled regardless of the presence of power on the power input.

15. The power supply regulation circuit of claim 1, wherein the first power switching circuit is configured to deactivate the voltage regulator automatically when a related circuit is not in use.

16. The power supply regulation circuit of claim 4,
wherein the second power switching circuit comprises:
a latching circuit coupled to the power input, the regulated voltage, ground, and a control output to the intervening circuit,
wherein when power is first received on the power input, the latching circuit is latched into a first state providing a voltage from the power input to the control output, and when the regulated voltage is subsequently received, the latching circuit is latched into a second state connecting the control output to ground.

* * * * *